Patented May 5, 1953

2,637,536

UNITED STATES PATENT OFFICE 2,637,536

METHOD OF DISPERSING MATERIALS IN WATER

Jack De Ment, Portland, Oreg., assignor to the United States of America as represented by the United States Atomic Energy Commission No Drawing. Application October 30, 1947,
Serial No. 783,215

1 Claim. (Cl. 259—1)

This invention relates to methods and means for the dispersal of certain materials in bodies of water such as reservoirs, lakes, streams, rivers, open tanks and the like.

It is an object of this invention to provide an improvement in the art of dispersing materials in relatively large bodies of water, e. g. lakes or streams, such that a dispersible material, whether soluble or insoluble in water is more effectively dispersed and spread throughout the water.

It is an object of this invention to provide an improvement in the art of toxic warfare, as for example involving radioactive toxic matter, radiological agent, bacterial toxic matter, herbicides and defoliating agents and the like, wherein bodies of water are the targets and wherein it is desired to effectively contaminate same.

It is an object of the present invention to provide methods and means whereby bodies of water are treated with materials possessing specific and special properties, as fully disclosed subsequently.

According to the objects hereinbefore set forth, and the disclosure given below, this invention can be employed in connection with that class of methods, means and weapons which embrace a novel variety of modern warfare, and which may generically be included in the terms "radioactive toxic warfare" or "radiological warfare," as distinguished from warfare involving primarily fissionable metal explosives.

When a substance is introduced into a large body of water the spread of that substance, whether soluble or insoluble, is generally very slow and the rate of spread or dispersion depends upon a number of variables, including convection currents within the water, mechanical factors which may cause agitation and so enhance spreading, diffusion, and the like.

In the contamination of reservoirs or other bodies of water with bacterial warfare agents, e. g., botulinus toxin or pathogenic microorganisms, it is desired to effectively contaminate the entire body of water by a substantially uniform distribution of the toxic agent. The same is true when other toxic agents are employed, either in warfare or for peacetime pursuits, such as is involved in employment of radioactive toxic matter or in utilization of such agents as herbicides and defoliating agents, e. g., dichlorophenoxyacetic acid and isopropylphenylurethane.

Likewise, other substances, such as dyestuffs, e. g., uranine or fluorescein, when introduced into a body of water for flow studies, must often be quickly and effectively dispersed therein. Sundry substances with special and specific properties such as heavy metals, e. g., for use as insecticides and fungicides, flocculating and precipitating reagents, e. g., silicas, lime, hydroxides of the alkaline earth elements, which are used in large scale chemical reactions such as in the recovery of trace elements from waters, e. g., those of natural springs and wells or sea water, must also be efficiently dispersed in the water before their action and properties are fully appreciated.

When such materials are introduced into a body of water they are ineffectually distributed throughout the volume of the water, and considerable periods may be required before the dispersal becomes uniform. It is true that special means of agitation, such as mechanical devices, air hoses and the like can be employed, but these are generally inapplicable to a very large body of water, and are therefore of limited value. It is also true that the materials may become disseminated by convection and other currents within the water, but these may not always be present, nor reliable for dispersion.

I have found that if a material to be dispersed in a body of water is introduced therein concurrently with or in combination with a gasogenic substance or composition which releases copious amounts of gas under the water that the material becomes effectively distributed via the agency of mechanical agitation, adsorption and absorption.

There are a number of gasogenic substances which may be chosen to accomplish this action, and the choice of the material, is governed by the nature of the material to be dispersed, whether or not alterations in chemical composition of the water body are tolerable, and like factors, all of which will be understood by those skilled in the art and science of chemistry.

Herein, the term "gasogenic substance" will be taken to include broadly any and all substances which once placed within water release gas, and which initially are solid in form.

The materials or agents to be dispersed by the method of the present invention may be in solid form or, in solution, under the conditions disclosed infra, in which oils and non-aqueous solvents or carriers are employed, as well as in certain cases in aqueous solutions or dispersions.

*Example 1.*—When it is necessary to disseminate and to disperse an agent within a body of water with a minimum of chemical action but with a maximum of gas release and concurrently a substantially non-reactive gas, I prefer solidified carbon dioxide, commonly known as "dry ice," as the gasogenic substance. Solid carbon dioxide is obtained in many forms, as briquettes, slabs, powder and the like, and under water its evolution of carbon dioxide gas continues at a vigorous and uninterrupted rate. Moreover, this gasogenic substance is economical, easily produced and obtained, and does not in general affect the chemical properties of most agents which are intended for dispersion in large bodies of water.

When an agent or material for dispersion of the kind disclosed hereinbefore is incorporated, by method and means disclosed below, with the solid carbon dioxide, the agent is dispersed into the water by the action of gas bubble evolution from the solid carbon dioxide. Thus, one gram of uranine, mechanically mixed and consolidated into say 500 grams of solid carbon dioxide will, within several cubic feet of water become dispersed throughout the water within a few minutes or at least assume a dissemination which is uniform by the time the carbon dioxide has ceased to release gas, depending upon the geometry of the water. This amount of uranine, introduced into the same amount of water without the solid carbon dioxide requires from several days to several weeks to become uniformly dispersed in the water, assuming no outside stirring.

The proportion of solid carbon dioxide to agent to be dispersed will vary greatly, according to the nature of the contamination or dispersion problem, rate of dispersion desired, climatic conditions in the case of natural water bodies, solubility of the agent, and the like. In general, from equal amounts, by weight of solid carbon dioxide and agent can be employed for many applications of a water soluble material, e. g., uranine, radiostrontium halide or water soluble bacterial toxin, on up to one part of agent to five thousand parts or more of solid carbon dioxide, the latter proportions involving special applications say where the agent is soluble in water with difficulty or completely insoluble in water (and to be dispersed in colloidal form) and where a very slow rate of release of the agent into the water is desired.

For example, if one hundred pounds of concentrate bearing the toxic agent will contaminate say ten million gallons of water (such that only a few cubic centimeters of water would cause lethal effects upon a human partaking same), anywhere from an equal weight of solid carbon dioxide on up to several hundred times the weight of concentrate is employed for dispersion in say a water reservoir. If, for example, the toxic agent, e. g., botulinus toxin, is to be employed in relatively pure form, then a few grams in 5000 grams of solid carbon dioxide may be used, this effectively dispersing the few grams of toxic agent in a very great quantity of water much more efficaciously than the few grams merely dropped into the same water at one or several points.

As to the physical make-up of the solid carbon dioxide and the agent to be dispersed, several forms may be taken or may be used. In the case of solids in powder-form, the Dry Ice may be crushed to pellets of 0.25 to 1 inch diameter, the agent to be dispersed mixed therewith, and the mixture then consolidated and frozen into a more or less compact mass. Or, after the mixture of the Dry Ice particles and the agent briquetting or production of thin slabs, say of from several ounces to several pounds weight, may be undertaken by methods and means which are well known to those skilled in the art.

The slabs or briquettes are then dropped into the body of water, in quantity and number corresponding to effective concentration, this varying between different toxic or other agents. The dropping means may be from aircraft or from the ground. In the case of aircraft, a plurality of the briquettes are dropped over the water body, and scattered more or less uniformly over the surface. Upon striking the surface of the water, the briquettes fall through the water, releasing their gas and dispersing the agent, until they sink to the bottom of the water body, whence they reside to release their gas and concurrently disseminate the agent.

Example 2.—Solid carbon dioxide possesses the advantages of releasing large amounts of relatively inert gas and leaving no residue or byproducts in the water body. Likewise, as a gasogenic substance it does not materially affect most agents of the type desired to be dispersed by the present invention, and therefore is of wide utility when reactivity and stability are important factors. However, solid carbon dioxide possesses the relative disadvantages of being short-lived, and requiring use before it transforms into the gaseous state, or at least storage at very low temperatures.

The present Examples 2 and 3 are directed to gasogenic substances which are amenable to long storage and which can be prepared far in advance of utilization.

The present Example 2 discloses as a gasogenic substance a reactive metal, metallic sodium, which is preferable because of ease of availability and low price.

Unlike solid carbon dioxide, which has a density of 1.56 (at −79 degrees centigrade) and which sinks in water, metallic sodium has a density of 0.97. Therefore, metallic sodium is useful as a gasogenic substance when it is desired to disseminate an agent from the surface of a water body, instead of from the bottom or from beneath the water, though this is optional and sodium may be caused to sink within water by the simple expedient of weighting with a dense material.

Moreover, metallic sodium, as a gasogenic agent, as contrasted to solid carbon dioxide as the same, is not especially suitable when the dispersible agent is in liquid form or when it is unstable or liable to reaction with the sodium. Therefore, those skilled in the art will recognize the limitations of sodium as a choice as a gasogenic substance for dispersing certain materials, e. g., organic substances.

However, for radioactive toxic agents, chemical flocculants and precipitants of many kinds, and other substances, the metallic sodium is quite useful. It is used in proportions set forth in Example 1, supra. The method of producing the agent and sodium mixture will vary from solid carbon dioxide in that the sodium can also be handled in a fused state. Otherwise, the metallic sodium can substitute for the solid carbon dioxide in Example 1 wherein particles of gasogenic substance and particles of the substance to be dispersed are mechanically mixed and then consolidated by mild pressure into larger pellets, slabs, briquettes or the like of mass varying according to the application. Sodium can be pressed since it is soft and pliable, and the pressures required are quite moderate, ranging upwards from ten pounds per square inch.

If it is desired to form bodies of sodium and a material to be dispersed wherein the bodies have a density greater than water, then pellets of some substance, say lead, are added so that the density of the product is greater than one, and so that the mixture will sink in water. Up to an equal weight of lead, for an equal weight of sodium, proves satisfactory.

For dropping from aircraft, the sodium product may be formed in rods, say several inches in diameter and one to several feet in length. Or the final form may be that of a small aerial missile or bomb, of streamlined design. A pressed sodium bomb of this kind may have, as desired, thin metal fins, of size and design well known to those skilled in the art, embedded in and protruding from one end, that is, be of "bomb-form."

The storage of the sodium containing mixtures, irrespective of form, must be very carefully undertaken in view of the fact that sodium reacts vigorously with water, alcohol and many other liquids containing hydroxyl groups. Thus, sodium bombs or projectiles or missiles should be stored in tightly closed containers, with little empty space, or under liquids containing no oxygen, such as mineral oils.

*Example 3.*—The previous Examples 1 and 2 deal with gasogenic substances which are very highly reactive and must be used under certain conditions, and this somewhat limits their applicability to a variety of problems involving dispersion of agents in a body of water.

The present example deals with a gasogenic substance which is an illustration of a rather large number and wide variety of formulations and compositions which can be chosen from the knowledge readily available to those skilled in the chemistry art, which can be employed after long storage under moisture-free conditions, and which can be employed cooperatly with both liquid and solid agents which are to be dispersed.

As examples of these gasogenic substances I prefer mixtures of an alkali metal bicarbonate together with one or more organic solids. Thus, a mixture of sodium bicarbonate with citric or tartaric acids, or a mixture of both, is employed to advantage. In the presence of water these compounds react with the evolution of carbon dioxide, and this gas upon release functions to disperse the agent in the manner set forth previously.

The proportion of agent to be dispersed is dependent upon the factors of applications and the like. disclosed supra. and may vary widely; that of the alkaline earth bicarbonate and of the organic acid is dependent upon their molecular relation to each other. It is necessary that all ingredients be freed of water before compounding.

In the representative formulations which follow it is pointed out that the proportion of agent to be dispersed is given for illustration purposes only and may vary widely according to the conditions and like factors disclosed hereinbefore:

| | Parts |
|---|---|
| Agent to be dispersed | 5 to 335 |
| Sodium bicarbonate | 356 |
| Tartaric acid | 160 |
| Citric acid | 148 | or

| | |
|---|---|
| Agent to be dispersed | 1 to 50 |
| Sodium bicarbonate | 570 |
| Tartaric acid | 300 |
| Citric acid | 195 | all parts by weight, say in grams, ounces or pounds, depending upon the nature and characteristics of the agent to be dispersed, and the conditions of its employment.

When the agent is in solid form, it is well the other ingredients listed supra should be compounded in powder form, for example, a fineness of less than 30 mesh. All ingredients must be freed of water, and in mixing a simple mechanical agitation suffices. However, it is desirable to have the gasogenic material and the agent to be dispersed in consolidated form, and I prefer pressing the mixture into small tablets or briquettes, say up to 50 grams weight, but usually about 5–10 grams weight, this being accomplished by the methods and means well known to those skilled in the art.

In the case of a liquid which is to be dispersed, the liquid must not contain water, and preferably comprises organic solvent or dispersion medium such as straight chain hydrocarbons, or a light petroleum oil. When this is the case, the gasogenic ingredients given supra are mixed and pressed into tablets first, and then soaked in the liquid agent, this being allowed to be absorbed into the pressed tablet. The excess dispersion medium or solvent may be permitted to evaporate or drain off. In the case of the radioactive toxic oil weapon, set forth in my application entitled "Radioactive Toxic Weapon," Serial Number 769,995, filed August 21, 1947, now abandoned, wherein a radioactive toxic oil for dispersal upon the surface of water bodies is disclosed, the pressed gasogenic tablets are merely soaked in the radioactive toxic oil and then used. As preferred, the aforementioned ingredients, may be used for lightly coating the article, by simply rolling the tablets therein or dusting with same.

In the case of tablets containing solid particles of agent to be dispersed, if it is desired to provide a delayed action once the gasogenic article has been dropped into water, the exterior surface may be coated with sugar, gelatin, starch, or other water soluble substance such as is employed and widely known in the pharmaceutical art. The method and means for coating tablets and pills are well known and need no further description.

In application to warfare, one or several tablets of gasogenic material containing say a biological warfare agent may be thrown into a reservoir by a saboteur; or, preferably, in large scale operations, low-flying aircraft may drop in scattering fashion up to several hundred thousand of these toxic gasogenic tablets into a body of water for the contamination of the same.

These tablets must be stored under water-free conditions, preferably sealed in metal containers. They are to be especially recommended in forms of warfare wherein a saboteur is to pollute the water system of a city or military target, since they may be carried substantially without fear of detection because of their innocent appearance, except of course in the case of highly active radiological agents.

I claim:

The method of mixing a material with a large volume of water which comprises the introduction into the water of the said material to be mixed with solid carbon dioxide the ratio of said material to the carbon dioxide between approximately 1:1 and approximately 1:5000 such that the release of gaseous carbon dioxide therefrom effects mixing of the said material with the said water.

JACK DE MENT.

References Cited in the file of this patent

UNITED STATES PATENTS

| Number | Name | Date |
|---|---|---|
| 738,481 | Pope | Sept. 8, 1903 |
| 824,294 | Griswold et al. | June 26, 1906 |
| 1,022,551 | Hewitt | Apr. 9, 1912 |
| 1,598,103 | Palmer | Aug. 31, 1926 |
| 1,923,004 | Seitz | Aug. 15, 1933 |

FOREIGN PATENTS

| Number | Country | Date |
|---|---|---|
| 101,295 | Great Britain | Aug. 9, 1917 |
| 479,224 | Great Britain | Feb. 2, 1938 |